United States Patent
Xu et al.

(10) Patent No.: US 12,405,639 B2
(45) Date of Patent: Sep. 2, 2025

(54) LENSLESS CAMERA POSITIONED BEHIND DISPLAY LAYER

(71) Applicant: Adeia Imaging LLC, San Jose, CA (US)

(72) Inventors: Ning Xu, Irvine, CA (US); Tao Chen, Palo Alto, CA (US)

(73) Assignee: Adeia Imaging LLC, San Jose, CA (US)

( * ) Notice: Subject to any disclaimer, the term of this patent is extended or adjusted under 35 U.S.C. 154(b) by 0 days.

(21) Appl. No.: 18/141,236

(22) Filed: Apr. 28, 2023

(65) Prior Publication Data

US 2024/0361812 A1 Oct. 31, 2024

(51) Int. Cl.
*G06F 1/16* (2006.01)
*G09G 3/34* (2006.01)
*H04M 1/02* (2006.01)
*H04N 23/955* (2023.01)

(52) U.S. Cl.
CPC .......... *G06F 1/1686* (2013.01); *G06F 1/1637* (2013.01); *G09G 3/344* (2013.01); *H04M 1/0264* (2013.01); *H04N 23/955* (2023.01); *G09G 2300/0439* (2013.01); *G09G 2310/0237* (2013.01)

(58) Field of Classification Search
CPC .................................................. G06F 1/1686
See application file for complete search history.

(56) References Cited

U.S. PATENT DOCUMENTS 9,057,931 B1  6/2015  Baldwin
9,626,023 B2  4/2017  Ludwig
11,803,238 B1 * 10/2023 Tesdahl ................. G06N 3/084
2012/0006978 A1 * 1/2012 Ludwig ................ G06F 3/0421
250/214.1
2019/0220121 A1 * 7/2019 Kim ....................... H10K 50/86
(Continued)

FOREIGN PATENT DOCUMENTS

CN   108551505 A   9/2018
CN   109618029 A   4/2019
EP     3952260 A1   2/2022

OTHER PUBLICATIONS

Antipa, N., et al., "DiffuserCam: lensless single-exposure 3D imaging", Optica, vol. 5, No. 1, 1-9, 2018.
(Continued)

*Primary Examiner* — Chun-Nan Lin
(74) *Attorney, Agent, or Firm* — HALEY GUILIANO LLP

(57) ABSTRACT

Systems and methods are described for enabling a lensless camera having an image sensor and a mask to be positioned behind a display screen of a device, which allows for the device to have an increased screen-to-body ratio. The image sensor captures an image based on the light that travels through the display screen and the mask. The display screen may include portions between pixel elements that allow light to pass through. The mask may include a pattern, such as an opaque material with portions that allow light to pass through from the portions of the display layer to the image sensor. The image captured by the image sensor may be indiscernible to humans. The system may utilize a trained machine learning model to reconstruct the image, using data about the pattern of the mask, so humans may visually recognize features in the image.

20 Claims, 9 Drawing Sheets

(56) References Cited

U.S. PATENT DOCUMENTS

| | | | |
|---|---|---|---|
| 2021/0352263 A1* | 11/2021 | He | H04N 13/207 |
| 2021/0364830 A1 | 11/2021 | Wang et al. | |
| 2022/0351539 A1* | 11/2022 | Hai | H10K 59/124 |
| 2023/0082406 A1 | 3/2023 | Yoon et al. | |
| 2023/0134491 A1* | 5/2023 | Sato | H04N 23/56 |
| 2023/0199327 A1* | 6/2023 | Sato | H04N 23/55 |
| | | | 348/222.1 |
| 2023/0316804 A1* | 10/2023 | Li | G06V 40/169 |

OTHER PUBLICATIONS

Asif, M. Salman, et al., "FlatCam: Thin, Lensless Cameras Using Coded Aperture and Computation", IEEE Transactions on Computational Imaging, vol. 3, No. 3, 384-397, 2017.

Boominathan, Vivek, et al., "Recent advances in lensless imaging", Optica, vol. 9, No. 1, 1-16, 2022.

De Looper, Christian, et al., "OnePlus 7 Pro has a selfie camera that pops up so fast you'll hardly see it", Digital Trends, retrieved at https://www.digitaltrends.com/mobile/oneplus-7-pro-mechanical-selfie-camera-explainer/, May 14, 2019.

Gill, Patrick R., et al., "Lensless Ultra-Miniature Imagers Using Odd-Symmetry Spiral Phase Gratings", Computational Optical Sensing and Imaging (Optical Society of America), CW4C-3, 2013.

Lunden, Ingrid, "Say goodbye to the notch? OTI raises $55M for technology to remove screen obstructions", TechCrunch, retrieved at https://techcrunch.com/2022/10/26/say-goodbye-to-the-notch-oti-raises-55m-for-technology-to-remove-screen-obstructions/, Oct. 26, 2022.

Luo, Jun, et al., "Under-Display Camera Image Enhancement via Cascaded Curve Estimation", IEEE Transactions on Image Processing, vol. 31, 4856-4868, 2022.

Mel, Mazen, "End-to-end Learning for Joint Depth and Image Reconstruction from Diffracted Rotation", Elsevier, 1-17, Apr. 15, 2022.

Porter, Jon, "Samsung's Galaxy A80 is an automated notchless slider with a rotating triple camera", The Verge, retrieved at https://www.theverge.com/circuitbreaker/2019/4/10/18304378/samsungs-galaxy-a80-release-date-specs- brice-features, Apr. 10, 2019.

Priday, Richard, "The battle of the under-display cameras: We have a winner", Tom's Guide, retrieved at https://www.tomsguide.com/news/the-battle-of-the-under-display-cameras-we-have-a-winner, Jul. 4, 2022.

Schneider, Jaron, "New Lensless Camera Captures 3D Depth Photos in a Single Exposure", PetaPixel, retrieved at https://petapixel.com/2022/09/13/new-lensless-camera-captures-3d-depth-photos-in-a-single-exposure/, Sep. 13, 2022.

Tajima, Kazuyuki, et al., "Lensless Light-field Imaging with Multiphase Fresnel Zone Aperture", 2017 IEEE International Conference on Computational Photography (ICCP), 1-7, 2017.

Tasneem, Zaid, et al., "Learning Phase Mask for Privacy-Preserving Passive Depth Estimation", European Computer Vision Association, 2022.

Tian, Feng, et al., "Learned lensless 3D camera", Optics Express, vol. 30, No. 19, 34479-34496, 2022.

Wu, Jiachen, et al., "DNN-FZA camera: a deep learning approach toward broadband FZA lensless imaging", Optics Letters, vol. 46, No. 1, 130-133, 2021.

Wu, Yicheng, et al., "PhaseCam3D—Learning Phase Masks for Passive Single View Depth Estimation", 2019 IEEE International Conference on Computational Photography (ICCP), 1-12, 2019.

Wu, Marissa, "The future of photography may be lensless", PopPhoto, retrieved at https://www.popphoto.com/news/lensless-camera-tokyo-tech/, May 7, 2022.

International Search Report and Written Opinion received for PCT Patent Application No. PCT/US2024/026250, mailed on Jul. 25, 2024, 16 pages (16 pages of Original Document).

* cited by examiner

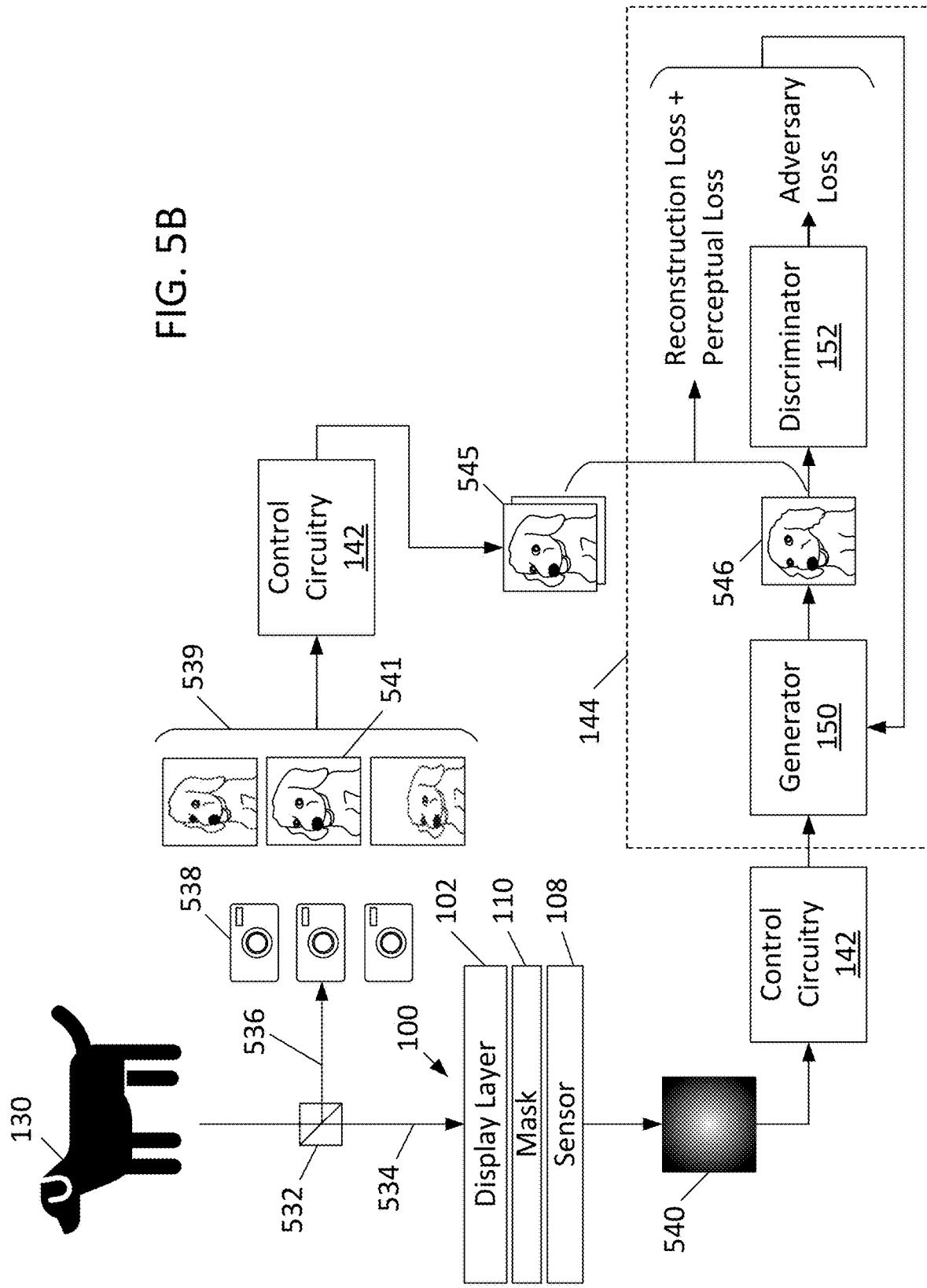

LENSLESS CAMERA POSITIONED BEHIND DISPLAY LAYER

FIELD OF THE DISCLOSURE

This disclosure is directed to systems and methods for using a lensless camera that is positioned underneath a display layer.

BACKGROUND

Devices having display screens, such as smartphones, tablets, and laptops, may have a front-facing camera for taking selfies or making video calls. The front-facing camera may be installed on the same side of the device as its screen, such as the front side that faces a user. The front-facing camera may be installed in a top bezel or a notch cut-out of the screen. However, the bezel and notch cut-out require space that could otherwise be occupied by the screen, which limits the maximum screen-to-body ratio of the display screen. Front-facing cameras may also be installed at a location that is away from the area of focus of the screen, such as the top or side of the screen. These locations draw the eye away from the screen, which may hinder video communication, where eye contact with a party on the screen may be desired. Thus, a device having a front-facing camera within the area of focus of the screen, without reducing the size of the screen, is needed.

In one approach, the front-facing camera resides inside the device and rises to protrude from the device when needed. The camera may rise up automatically, such as when a user opens a camera app on the device, or may be manually raised by the user. While this approach may not reduce the screen size, it requires storage space inside the device, which may be needed to house other components and circuits of the device. This approach also requires a lifting mechanism to raise and lower the camera, which may increase design costs or introduce additional failure modes into the device. Further, the camera is positioned even further from the area of focus of the screen and may reduce eye contact during video calls.

In another approach, the device has a rotatable rear-facing camera that may rotate to face the front of the device, becoming the front-facing camera. The rotatable camera may protrude from the device when functioning as the front-facing camera, or may be positioned in a notch of the front of the device. The rear-facing camera may rotate automatically when needed or manually by a user. This approach may have a limited impact on internal storage space since the rear-facing camera is not stored inside the device. However, this approach may require a rotational mechanism that may present similar challenges as the lifting mechanism of the front-facing camera previously discussed. This approach also draws the user's gaze away from the area of focus of the screen and does not improve eye contact during video calls.

In another approach, the front-facing camera may be a miniature lens-based camera placed under the screen. While this approach may improve video communication by allowing the user to look at the party on the screen, it requires light to travel through the screen, through the lens of the camera, and to camera sensors of the miniature lens-based camera, which may result in low-light transmission and diffraction effects that negatively impact the quality of the captured images. The miniature lens-based camera may also have a small lens aperture and small sensor size that adversely impacts the quality of the captured image. A sophisticated computational model may be required to enhance the quality of the captured images. Thus, the miniature lens-based camera placed under the screen may not provide adequate image quality and may require powerful computational resources, which may limit the types of devices available to implement this approach.

Further, the lens-based optical system of the miniature lens-based camera requires a distance between the lens and camera sensors, which may require an increased thickness of the device since the camera is positioned behind the screen. The distance between the lens and camera sensors may be reduced to compensate but may require a reduced sensor size that can adversely affect image quality.

Accordingly, there is a need to provide a front-facing camera that provides a high-quality image and allows for an increased screen-to-body ratio. Such a solution leverages the thin, compact footprint of an image sensor and a mask to capture images.

SUMMARY

To help address these problems, systems and methods are provided herein that enable a lensless camera having an image sensor and a mask to be positioned behind a display screen of a device, which allows for the device to have an increased screen-to-body ratio. A machine learning (ML) model is also provided herein to generate images based on the light that travels through the display screen and the mask and is received by the image sensor.

In one approach, a lensless camera includes an image sensor (e.g., a complementary metal-oxide-semiconductor (CMOS) sensor) and a mask that are positioned behind a display layer of a device. The image sensor captures an image based on the light that travels through the display layer and the mask. Thus, in some embodiments, the lensless camera may include the image sensor, the mask, a portion of the display layer disposed above the mask (e.g., the portion that allows light to travel through to the mask). The captured image may be indiscernible to humans. The system may utilize a computing system that is communicatively connected to the image sensor for capturing an image of an environment or a feature (e.g., by converting detected photons into electric signals). The display layer may include portions between pixel elements that are at least partially transparent (referred to as portions of the display layer), where the portions of the display layer allow light to pass through. The image sensor may include a physical mask that comprises a predetermined pattern (e.g., a pinhole pattern). For example, the physical mask may comprise an opaque material (e.g., a fully non-transparent material) with portions that are at least partially transparent (e.g., that allow light to pass through from the portions of the display layer). The portions of the mask that are at least partially transparent (referred to as portions of the mask) may be shaped according to the pattern. Alternatively, the pattern may refer to the pattern of the opaque material. The mask pattern may be generated using random spacing of opaque or clear bands and/or shapes, or created according to an obfuscated algorithm, or manually created by a provider or by a user. The pattern of the mask may distort (e.g., blur) the captured image data, for example by casting a shadow on the light-sensing part of the camera and/or by causing refraction in the incoming light.

Because the camera may be lensless and may not focus the incoming light the computing system may not be able to reconstruct the distorted image of the environment based only on the light that passed through the pattern. Giving the computing system access to data that represents the pattern of the mask and layout of the portions of the display layer allows the computing system to reconstruct the image of the environment. The computing system may use a trained ML model to generate the reconstructed image.

In one approach, the device prevents light emitted by the display layer from reaching the image sensor. In some embodiments, the device may use a casing around the pixel elements to block the light from reaching the image sensor, or to direct the light away from the image sensor. In some embodiments, the device may also ensure the pixel elements near the image sensor do not emit light when the image is captured.

In some embodiments, the ML model is trained using input and output training images. The ML model uses the input training image and data about the pattern of the mask to generate an attempted reconstructed image, which is then compared to the output training image. The ML model is updated based on the comparison and another attempted reconstructed image is generated. This process is repeated until the attempted reconstructed image is sufficiently close to the output training image. In some embodiments, the ML model is trained using large datasets or batches of input and output training image pairs. The training process may be repeated until the attempted reconstructed images are sufficiently close to the output training images.

In some embodiments, the data about the pattern of the mask may be an image (or series of images) that is based on light that passed through the mask. In some embodiments, the training input image contains the data about the pattern of the mask. In some embodiments, the data about the pattern of the mask further includes data about the portions of the display layer, since the light that passed through the mask may have previously passed through the display layer. In some embodiments, the data about the pattern of the mask may be separately provided into the ML model. In some embodiments, the ML model may be trained for one specific pattern of the mask. In such embodiments, multiple masks may be produced having the same specific pattern and each of the masks may be used in a similar, but physically different device (e.g., a model of a smartphone).

In some embodiments, the training output image contains depth information relating to distances of features contained therein. For example, if the output training image was taken by a camera, then the depth information may contain distances from the camera to the features in the output training image. In some embodiments, an array of cameras may capture images of the features at slightly different angles or orientations. In such embodiments, the output training image may be computed from the images taken by the camera array. The training input image may contain depth information. The image sensor may capture light at different angles, e.g., light that has reflected off features in different positions of the environment. The ML model may apply attempted reconstructed depth information to the attempted reconstructed image to create an output image and compare the output image to the output training image. The ML model is updated until the attempted reconstructed depth information is sufficiently close to the depth information of the training output image. The ML model may be trained to generate the reconstructed depth information simultaneously while being trained to generate the reconstructed image, or in separate training operations. In some embodiments, the output image is a depth image.

In some embodiments, the pattern of the mask may be configurable. For example, the system may configure opaque portions of the mask to change how light is blocked. The configurable pattern may increase privacy. For example, if the pattern of the mask is changed from an initial pattern on which the ML model was trained, the ML model may not be able to generate the reconstructed image using the captured image without retraining. Thus, the environment, features, or people in the captured images remain indiscernible in the reconstructed images until the pattern is changed back to the initial pattern. In some embodiments, the entire mask may be set to opaque when the image sensor is not used.

Using the methods described herein, an image sensor having a mask may be positioned under a display screen. This approach allows a device having the display screen to maximize a screen-to-body ratio and have a thickness that is less than if using a lens-based camera. The lensless, under-display cameras may also improve video communication, allowing the camera to be placed in-line with the eyes of the person in the video call, making eye contact feel more natural. Multiple under-display cameras may be used at different locations under the display to make the gaze adjustment much easier than having a camera array located outside the display screen.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 5B shows an illustrative technique for training a machine learning model for image reconstruction, in accordance with some embodiments of this disclosure;

DETAILED DESCRIPTION

Figure 1:
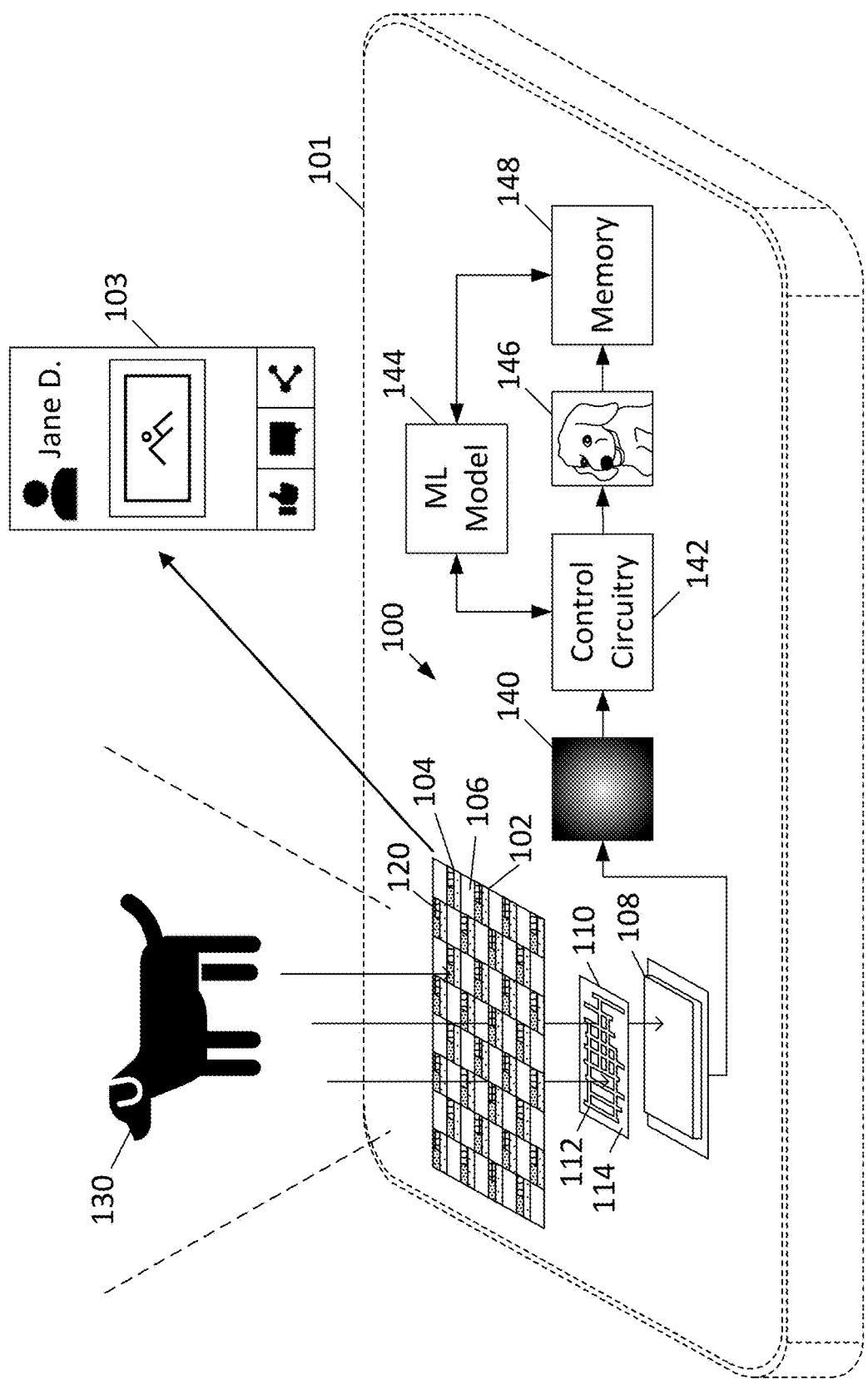
FIG. 1 shows an illustrative diagram of an under-display camera, in accordance with some embodiments of this disclosure.

FIG. 1 shows an illustrative diagram of an under-display, lensless camera 100, in accordance with some embodiments of this disclosure. The lensless camera 100 is part of a device 101, which is depicted as a phone. In some embodiments, the device may be a television, computer monitor, video game system, or any device having a screen. The lensless camera 100 includes an image sensor 108 that is positioned under a display layer 102 of the device 101. The lensless camera 100 further includes a mask 110 that is disposed between the image sensor 108 and the display layer 102.

Light reflects off an object or feature 130, shown as a dog, and travels through the display layer 102, through the mask 110, and to the image sensor 108, which captures a captured image 140 of the feature 130. The captured image 140 may be visually indecipherable to humans. Control circuitry 142 inputs the captured image 140 into a trained machine learning (ML) model 144. The ML model 144 generates a reconstructed image 146 of the feature 130 that humans can visually recognize. The control circuitry 142 retrieves the reconstructed image 140 from ML model 144 and stores it in a memory 148 of the device 101. The ML model 144 may reside in the memory 148. In some embodiments, the ML model 144 may place the reconstructed image 146 in the memory 148, e.g., without the control circuitry 142.

The image sensor 108 may include a complementary metal-oxide-semiconductor (CMOS) sensor, a charge-coupled device (CCD) sensor, or any other suitable type of a light sensor configured to produce pixel data that is based on light hitting a light-sensitive front of the image sensor 108.

The mask 110 may be manufactured out of any suitable opaque material 114 that prevents penetration by light. For example, mask 110 may be manufactured using plastic, metal, wood, (stained) glass or any other suitable opaque materials. The mask 110 comprises portions 112 that are at least partially transparent, forming a pattern. The portions 112 may allow light that penetrates the display layer 102 to further penetrate the mask 110 and travel to the image sensor 108. The pattern of the portions 112 (also referred as the mask pattern or the pattern of the mask 110) may be defined randomly. For example, the pattern of the portions 112 may include horizontal and vertical cuts of different lengths and widths. In another example, the horizontal and vertical cuts may be randomly spaced and/or be a randomly selected length and width. In another example, a certain number of holes may be selected. The holes may have different shapes, such as rounded, circular, or polygonal shapes, that have a known or random position.

The pattern may also be created using an algorithm, such as a hidden algorithm not accessible to anyone trying to decode the pattern. The pattern may also be selected by a manufacturer or by the end user. For example, the user may be able to define any kind of pattern and mask 110, which may be a three dimensional (3D) printed mask, with the defined pattern. The term "pattern" may also refer to the configuration of the opaque material 114 of the mask 110.

In some embodiments, the portions 112 of mask 110 may contain or be filled with a transparent material (e.g., glass or clear plastic) or semi-transparent material. In some embodiments, the mask 110 may include a transparent material (e.g., glass or clear plastic) with a pattern of opaque markings printed on the transparent material. In some embodiments, the transparency of the mask 110 may be configurable such that the shape and area of the portions 112 and the opaque material 114 may be changed.

The mask 110 may be positioned over the image sensor 108 during the manufacturing process, or in post-production. In some embodiments, the mask 110 may be sold or provided separately from image sensor 108 and positioned over the image sensor 108 by an end user or installation technician, such as through a slot in the device 101 (e.g., similar to a memory card or subscriber identity module (SIM) card).

The display layer 102 may include any suitable display technology that allows light to pass through at least when the display is off. In the depicted embodiment, a portion of the display layer 102 positioned above the image sensor 108 is shown and a remaining portion of the display layer 102 is omitted to avoid overcomplicating the drawing. The display layer 102 includes a plurality of pixel elements 104 and portions 106 between the pixel elements 104 that are at least partially transparent. The pixel elements 104 emit light of different colors and are shown in a grid pattern with the corners touching another. Each pixel element 104 comprises three subpixels 120 (e.g., red, green, and blue). In some embodiments, the pixel element 104 may include more or fewer subpixels 120 (e.g., red, green, blue, and white). In some embodiments, the subpixels 120 may each be a different size or have a different area. Some embodiments may include pixel elements 104 having more subpixels 120 that emit a first color (e.g., green) than subpixels 120 that emit a second color and third color (e.g., blue and red). In some embodiments, the pixel elements 104 may not have subpixels 120 and each pixel element 104 may emit light of a color (e.g., red, green, or blue). The portions 106 of the display layer 102 may include any of openings, lenses, transparent material, semi-transparent material, or any configuration that allows light to at least partially pass through, e.g., to the mask 110 or to the image sensor 108.

Once assembled, the display layer 102 and the mask 110 may form a coded aperture of the lensless camera 100. The display layer 102 and the mask 110 may each block or refract some of the light from traveling to image sensor 108 that is reflected off the feature 130. The mask pattern allows light that is directed through, passes through, or otherwise travels through a first subset of the portions 106 to be directed to the image sensor 108, since the mask 110 is positioned under the display layer 102. The opaque material 114 of the mask 110 blocks light such that the image sensor 108 of lensless camera 100 (e.g., CMOS sensor, CCD sensor, etc.) is able to receive light only through the first subset of the portions 106 of the display layer 102, and through the portions 112 in the mask 110 to form heavily distorted (e.g., blurred) image data (e.g., the captured image 140). For example, light that is directed through a second subset of the portions 106 may be blocked from reaching the image sensor 108 by the opaque material 114. Thus, the captured image 140 may contain data defining the pattern of the mask 110 and a layout (or pattern) of the portions 106 of the display layer 102. The second subset of the portions 106 may be different than the first subset of the portions 106. In some embodiments, the second subset of portions 106 may include portions 106 that are not in the first subset of portions 106. In some embodiments, the second subset of portions 106 is positioned entirely above the mask 110.

The control circuitry 142 may generate the captured image 140 based on the light that is directed through the first subset of the portions 106, through the pattern of the mask 110, and to the image sensor 108. In some embodiments, the image sensor 108 may generate the captured image 140 and the control circuitry 142 may interface with the image sensor 108 (or the lensless camera 100) to retrieve the captured image 140. As will be explained, an undistorted image (e.g., training output image 545 in FIG. 5B) is not recoverable based on pixel data (e.g., the captured image 140) produced by the image sensor 108 without data that defines at least the dimensions of the pattern of mask 110. In some embodiments, additional data that defines the properties of the mask 110 may be needed (e.g., sensor field of the mask 110).

The control circuitry 142 generates the reconstructed image 146 based on the captured image 140 and the data defining the pattern of the mask 110. For example, the control circuitry 142 inputs the captured image 140 into the ML model 144, which was captured using light that was directed through the portions 106 of the display layer 102 and the patten of the mask 110, and outputs the reconstructed image 146 to the control circuitry 142. The ML model 144 may access the memory 148 when creating the reconstructed image 146. The reconstructed image 146 is stored in the memory 148 and may be displayed on the display layer 102. In the depicted embodiment, the control circuitry 142 is part of the device 101. In some embodiments, the control circuitry 142 may be external to the device 101 and may reside on, e.g., a server or cloud computing device.

In some embodiments, the control circuitry 142 changes the pattern of the mask 110 by turning on and off the transparency of the mask 110 or by adjusting the opacity of the mask 110. In some embodiments, the control circuitry 142 may change the shape of the portions 112 (e.g., transparent material) or the shape of the opaque material 114. For example, the control circuitry 142 may configure the mask 110 to be opaque or fully opaque when the image sensor 108 is not active (e.g., not powered or capturing images). In some embodiments, such as when the mask 110 is opaque, the opaque material 114 of the mask 110 is configured to block light directed through the first subset of the portions 106 of the display layer 102 from traveling to the image sensor 108. In some embodiments, such as when the mask 110 is fully opaque, the transparency of the mask 110 is turned off. For example, the mask may be configured such that the opaque material 114 covers the entire surface of the mask 110 facing the display layer 102 and does not allow light to travel through the mask 110. The control circuitry 142 may set the mask to be opaque or fully opaque when a subset of the pixel elements 104 emit light and the image sensor 108 is not active. The subset of the pixel elements 104 emitting light may be disposed above the mask 110 or above portions of the mask 110 disposed over the image sensor 108. The control circuitry 142 may set at least a portion of the mask 110 to be transparent when the subset of the pixel elements 104 do not emit light and the image sensor 108 is active. In some embodiments, the control circuitry 142 may control the pixel elements 14 and may alternate between the subset of the pixel elements 104 emitting light and the image sensor 108 being active at a predetermined frequency. In some embodiments, the predetermined frequency is a frequency that is ergonomic to the human eye. The predetermined frequency may be a frequency where the human eye does not notice a flicker in the display layer 102. In some embodiments, the predetermined frequency may be at least 24 Hz. In some embodiments, the mask 110 includes an electronic ink layer, e.g., for the opaque material 114, and the control circuitry 142 reconfigures the electronic ink layer to turn on and off the transparency of the mask 110. In some embodiments, the electronic ink layer may be a substantially similar size as the display layer, such as within an area of 99%, such as within 95%, such as within 90%. In some embodiments, the electronic ink layer may be used to display content (e.g., an image, text, and the like) to a user of the device 101. The electronic ink layer may be used instead of the display layer 102, such as when the display layer is turned off (e.g., the pixel elements 104 do not emit light).

In some embodiments, the display layer 102 includes a bottom substrate layer, a cathode layer, an anode layer, and an emission layer. In such embodiments, the bottom substrate layer may include a transparent or semi-transparent material, the cathode layer may inject electrons, and the anode layer may receive the injected electrons. The emission layer may be positioned in between the cathode and anode layers, and may emit light when the ejected electrons pass through. The emissive layer may include organic plastic molecules, and a color of the emitted light may depend on the type of the organic molecules. The intensity of the emitted light may depend on a magnitude of a current applied to inject the electrons. If some embodiments where the substrate layer is transparent, the other layers of the display layer 102 may also be transparent such that the display layer 102 is transparent when turned off and light may be directed through the display layer 102 from either direction. In some embodiments, the mask 110 is part of the display layer 102. For example, the mask 110 may be printed on, bonded to, or formed within a the bottom substrate layer of the display layer 102.

In some embodiments, transparency of the portions 106 may be controlled, e.g., by the control circuitry 142, similar to the transparency of the mask 110. In some embodiments, the display layer 102 includes a liquid crystal display (LCD) and its derivative technologies, such as light-emitting diode (LED), quantum dot LED (QLED), mini-LED, and micro-LED, to name a few examples. In some embodiments, the display layer 102 may comprise an organic light-emitting diode (OLED). The display layer 102 may display an image that is different than the captured image 140 and the reconstructed image 146, such as a media asset 103, which is shown as a social media post. Thus, a user may view the media asset 103 on the display layer 102 that is unrelated to operation of the image sensor 108. In some embodiments, the display layer 102 may display the media asset 103 while the image sensor 108 captures the captured image 140.

In some embodiments, the mask 110 may be an amplitude-coded mask. In some embodiments, the mask 110 may be a phase mask. In some embodiments, the mask 110 may be one of a diffuser, diffraction grating, or Fresnel lens plate, to name a few examples.

In some embodiments, multiple image sensors 180 and masks 110 may be placed under the display screen 102 to form multiple lensless cameras 100 of the device 101. The multiple lensless cameras 100 may be used to align the reconstructed image 146 with a user's eye, such as aligning with a pupil of the eye, so the user appears to maintain eye contact with a viewer of the reconstructed image 146. The multiple lensless cameras 100 may be used to capture captured images 140 at different angles or orientations, which may help generate a depth map as discussed in FIG. 5B. The multiple lensless cameras 100 may be used to simultaneously capture multiple captured images 140, which may be used to compensate for a low amount of light that traveled the image sensors 108. Such an embodiment may be used for capturing images where ambient light is low, such as when the ambient light is at or below 180 lumens, such as at or below 50 lumens, such as at or below 15 lumens. The multiple lensless cameras 100 may be used to simultaneously capture multiple captured images 140 that may be "stitched" together (e.g., by the control circuitry 142) to create one image with a larger resolution and/or field-of-view.

Figure 2:
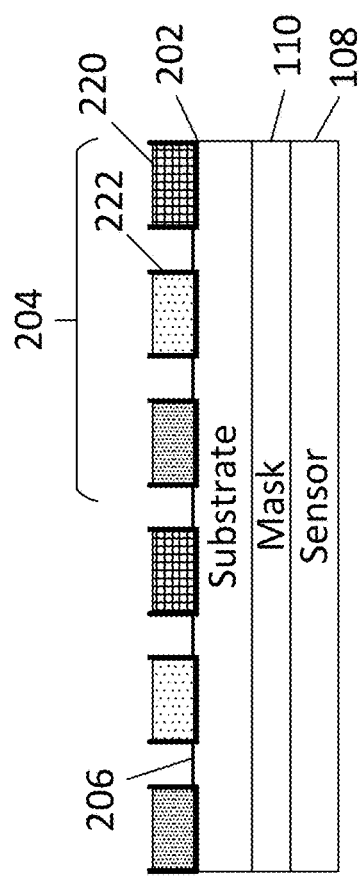
FIG. 2 shows a side-sectional view of a display layer, in accordance with some embodiments of this disclosure.

FIG. 2 shows a side-sectional view of a display layer 202, in accordance with some embodiments of this disclosure. The display layer 202 includes pixel elements 204 disposed on a transparent substrate, and portions 206 between the pixel elements 204 that are at least partially transparent. Each pixel element 204 includes subpixels 220 that emit different colors (e.g., red, green, and blue). The portions 206 are depicted as openings between the subpixels 220 and portions of the transparent substrate in-line with the openings. The mask 110 and the image sensor 108 are disposed below the display layer 202 such that light is directed through a subset of the portions 206, through the pattern of the mask 110, and to the image sensor 108.

The subpixels 220 each include a casing 222 to block light emitted by the subpixels 220 from traveling through the portions 206 and to the image sensor 108. The casing 222 may include an opaque material. The subpixels 220 may be arranged in different patterns. For example, a pattern of the subpixels 220 may be such that the pixel elements 204 do not form a grid pattern with the corners of the pixel elements 204 touching another, such as described in relation to FIG. 1. In some embodiments, the pattern of the subpixels 220 may be equally spaced. In some embodiments, the configuration of the colors emitted by the subpixels 220 may be arranged differently. In some embodiments, the subpixels 220 of each pixel element 204 may emit other or additional colors, such as white.

In some embodiments, the casing 222 may cover a side of the subpixels 220 that faces the image sensor 108. In some embodiments, the casing 222 surrounds all but one side of the subpixels 220 to only allow light emission in a direction facing away from the image sensor 108. In some embodiments, the casing 222 may cover the backside of the subpixels 220 that face the image sensor 108 and a portion of sidewalls of the subpixels 220 that face the portions 206.

In some embodiments, the casing 222 may be disposed around the pixel elements 204, which includes the subpixels 220. For example, the casing 222 may extend between the subpixels 220 such that the casing 222 blocks light from being directed through the portions 206 between the subpixels 220. In some embodiments, the pixel elements 104 discussed in relation to FIG. 1 may comprise the casing 222.

In some embodiments, the pixel elements 204 include stacked subpixels 220. For example, the pixel elements 204 may include a subpixel 220 stack having emission layers (e.g., one for each color emitted) and electrodes (e.g., transparent electrodes) between the emission layers and on top of the uppermost emission layer. An electrode (e.g., transparent, opaque, or semi-transparent electrode) may be between the pixel stack and a substrate (e.g., transparent, opaque, or semi-transparent substrate) of the display layer 202. The stacked subpixel 220 configuration may allow for the portions 206 of the display layer 202 to be larger, which may direct more light through the display layer 202.

Figure 3:
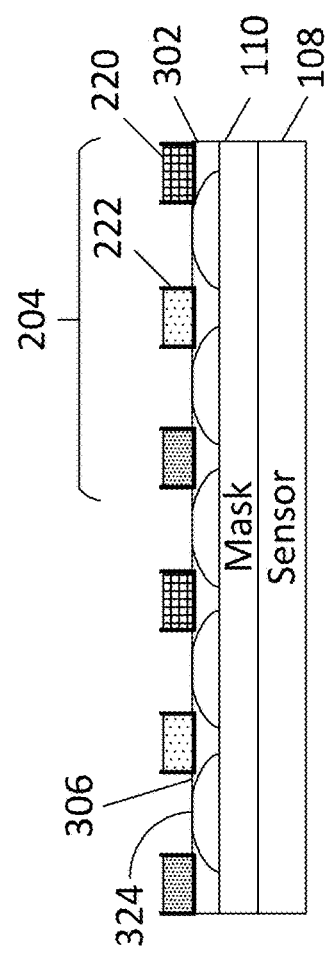
FIG. 3 shows a side-sectional view of a display layer, in accordance with some embodiments of this disclosure.

FIG. 3 shows a side-sectional view of a display layer 302, in accordance with some embodiments of this disclosure. The display layer 302 includes the pixel elements 204 disposed on a substrate, which may or may not be transparent. The substrate comprises a plurality of microlenses 324. The microlenses 324 are disposed in the substrate and are aligned with portions 306 of the display layer 102 that are at least partially transparent. The portions 306 are depicted as openings between the subpixels 220. The subpixels 220 include the casings 222. The mask 110 and the image sensor 108 are disposed below the display layer 202 such that light is directed through a subset of the portions 306, through a subset of the microlenses 324, through the pattern of the mask 110, and to the image sensor 108. The microlenses 324 may help focus and concentrate light that travels through the portions 306, and then through the mask 110, onto the image sensor 108. Focusing the light may result in more photons of the light reaching the image sensor 108, which may increase the brightness of the captured image 140 (FIG. 1).

In some embodiments, each microlens 324 may be disposed under a pixel element 204 such that each microlens 324 is disposed under all of the subpixels 220 of the pixel element 204. In some embodiments, the microlenses 324 may be disposed between the pixel elements 204, but not between the subpixels 220 of the pixel elements 204. In some embodiments, the microlenses 324 may be disposed in a portion of the display layer 302 above the image sensor 108 such that the microlenses 324 and not disposed in other portions of the display layer 302 (e.g., portions not above the image sensor 108).

In some embodiments, the microlenses 324 may be disposed between the portions 306 of the display layer 302 and the portions 112 (FIG. 1) of the mask 110 such that a pattern of the microlenses 324 is "coded" to or based on the pattern of the mask 110. For example, the microlenses 324 may not be present in the portions 306 above the opaque material 114 (FIG. 1) of the mask 110. In some embodiments, the microlenses 324 may be disposed in a microlens layer that is separate than the display layer 302. In such embodiments, the portions 306 may include openings and/or transparent or semi-transparent material. The microlenses 324 of the microlens layer may be aligned with the portions 306 of the display layer 302. In some embodiments, the microlenses 324 may be disposed in the mask 110, such as in the portions 112 of the mask 110. In some embodiments, the display layer 302 and the microlenses 324 may be used without the mask 110.

Figure 4:
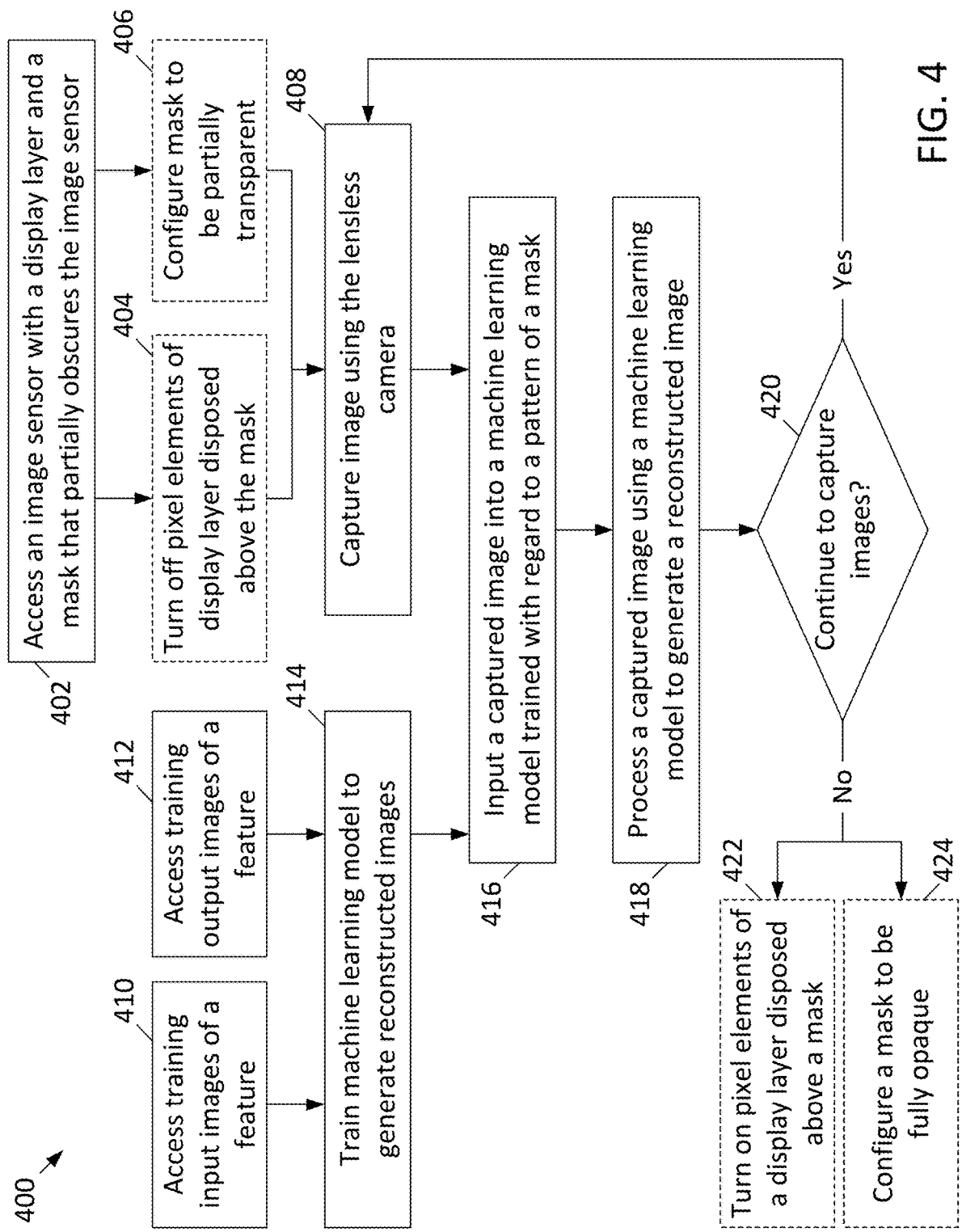
FIG. 4 is a flowchart of a detailed illustrative process for generating a reconstructed image, in accordance with some embodiments of this disclosure.

FIG. 4 is a flowchart of a detailed illustrative process 400 for generating a reconstructed image (e.g., the reconstructed image 146 in FIG. 1), in accordance with some embodiments of this disclosure. The process and operations shown in FIG. 4 may be implemented, in whole or in part, by one or more systems or devices described herein.

The process 400 includes operation 402 with accessing, e.g., using control circuitry (e.g., control circuitry 142 in FIG. 1 and control circuitry 604, 711 described below in FIGS. 6 and 7), an image sensor (e.g., image sensor 108 in FIGS. 1, 2, and 3) of a lensless camera (e.g., lensless camera 100 in FIG. 1 and described below in FIG. 5) with a display layer (e.g., display layer 102, 202, 302 in FIGS. 1, 2, and 3 and display layer 902 and 962 below in FIGS. 9A and 9B) and a mask (e.g., mask 110 is FIGS. 1, 2, and 3 and mask 810 below in FIGS. 8A-8C) that partially obscures the image sensor, such as described above with respect to FIG. 1. The process optionally continues to operation 404 with turning off, e.g., using the control circuitry, pixel elements (e.g., pixel elements 104, 204 in FIGS. 1, 2, 3, and 8 and pixel elements 904 and 964 below in FIGS. 9A and 9B) of the display layer disposed above the mask. The process optionally continues to operation 406 with configuring, e.g., using the control circuitry, the mask to be partially transparent, such as described above with respect to FIG. 1. The process 400 continues to operation 408 with capturing an image (e.g., captured image 140 in FIG. 1) using the lensless camera. Operations 402, 404, 406, and 408 may be performed before, after, or in parallel with operations 410, 412, and 414. Operations 404 and 406 are optional because the image may be captured without turning off the pixel elements or configuring the mask.

The process 400 continues to operation 410 with accessing, e.g., using the control circuitry, training input images of a feature, such as described below with respect to FIGS. 5A and 5B. The process 400 continues to operation 412 with accessing training output images of a feature, such as described below with respect to FIGS. 5A and 5B. The process 400 continues to operation 414 with training, e.g., using the control circuitry, an ML model (e.g., ML model 144 in FIG. 1 and below in FIG. 5B) to generate reconstructed images (e.g., reconstructed image 146 in FIG. 1 and below in FIG. 5B), such as described below with respect to FIGS. 5A and 5B. Operations 408 and 414 may be inputs into operation 416. Each of operations 408 and 414 may occur at different times and at different frequencies than the others.

The process 400 continues to operation 416 with inputting, e.g., using the control circuitry, the captured image into the ML model trained with regard to a pattern of the mask, such as described above with respect to FIG. 1. The process 400 continues to operation 418 with processing the captured image using the ML model to generate the reconstructed image. Thus, the ML model may generate the reconstructed image based on the captured image and data defining the pattern of the mask. The data defining the pattern of the mask may account for, or may include data defining a layout of portions of the display layer that are at least partially transparent (e.g., portions 106, 206, 306 in FIGS. 1, 2, 3, and 8 and portions 906 and 966 described below in FIGS. 9A and 9B), such as described above with respect to FIG. 1. The process 400 continues to operation 420 with a decision on whether to continue to capture images. If additional images are to be captured, the process returns to operation 408. If no additional images are to be captured, the process 400 may optionally proceed to operations 422 and 424, after which, the process 400 may end. In operation 422, the process 400 optionally continues with turning on, e.g., using the control circuitry, the pixel elements of the display layer disposed above the mask. In operation 424, the process 400 optionally continues with configuring, e.g., using the control circuitry, the mask to be fully opaque, such as described above with respect to FIG. 1.

Figure 5A:
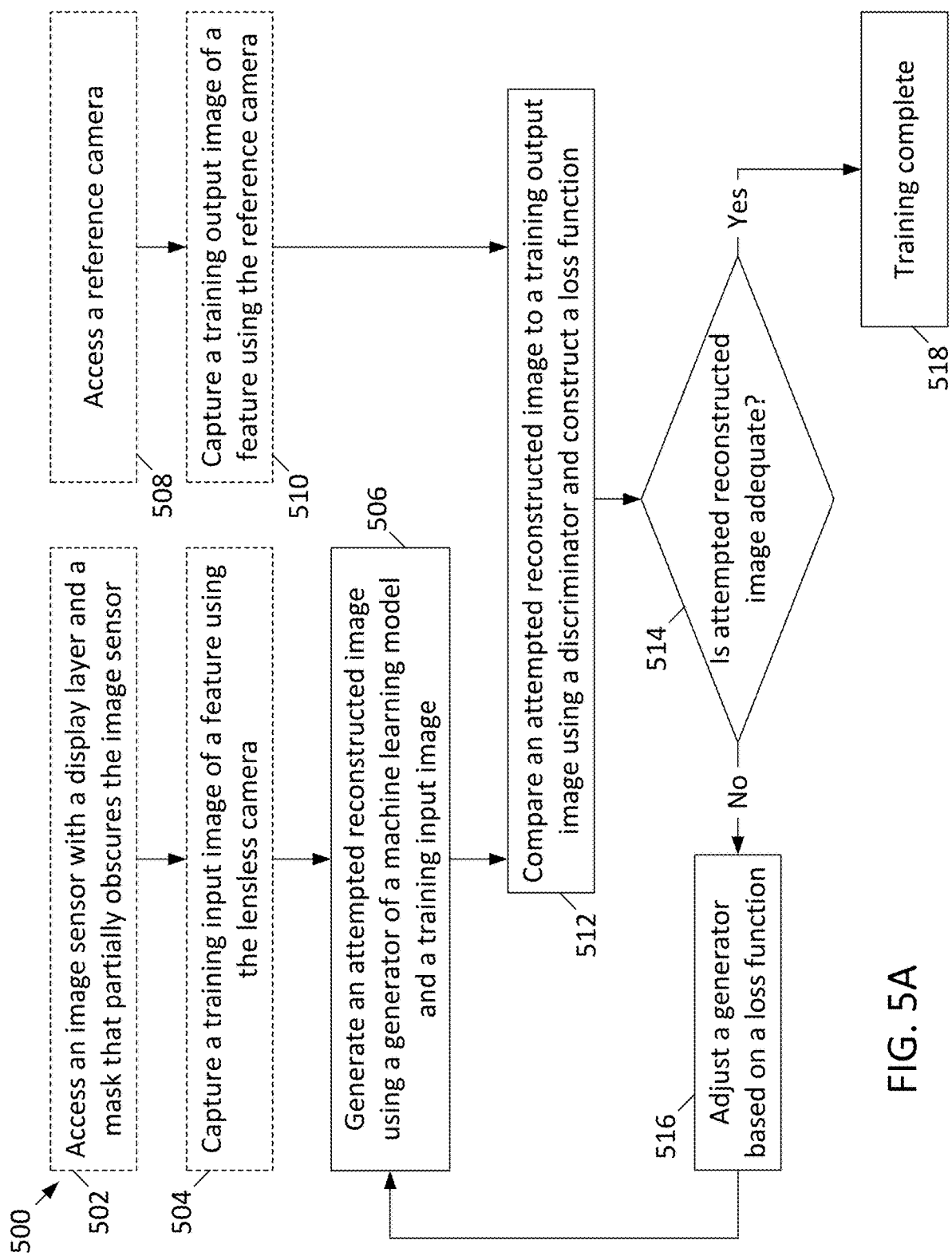
FIG. 5A is a flowchart of a detailed illustrative process for training a machine learning model for image reconstruction, in accordance with some embodiments of this disclosure.

FIG. 5A is a flowchart of a detailed illustrative process 500 for training an ML model for image reconstruction, in accordance with some embodiments of this disclosure. The process and operations shown in FIG. 5A may be implemented, in whole or in part, by one or more systems or devices described herein.

The process 500 optionally includes operation 502 with accessing, e.g., using control circuitry (e.g., control circuitry 142 in FIG. 1 and control circuitry 604, 711 described below in FIGS. 6 and 7), an image sensor (e.g., image sensor 108 in FIGS. 1, 2, and 3) of a lensless camera (e.g., lensless camera 100 in FIG. 1 and described below in FIG. 5) with a display layer (e.g., display layer 102, 202, 302 in FIGS. 1, 2, and 3 and display layer 902 and 962 below in FIGS. 9A and 9B) and a mask (e.g., mask 110 is FIGS. 1, 2, and 3 and mask 810 below in FIGS. 8A-8C) that partially obscures the image sensor, such as described above with respect to FIG. 1. The process 500 optionally continues to operation 504 with capturing a training input image of a feature using the lensless camera, such as described below with respect to FIG. 5B. The training input image is captured using the light that is directed through the display layer (e.g., portions 106, 206, 306 in FIGS. 1, 2, 3, and 8 and portions 906 and 966 described below in FIGS. 9A and 9B), through the mask (e.g., pattern of the mask), and to the lensless camera. Thus, the training input image includes data defining the pattern of the mask, which may include data defining a layout of the portions of the display layer. The process continues to operation 506 with generating an attempted reconstructed image (e.g., reconstructed image 146 in FIG. 1 and below in FIG. 5B) using a generator (e.g., generator 150 described below in FIG. 5B) of an ML model (e.g., ML model 144 in FIG. 1 and below in FIG. 5B) and a training input image, such as described below with respect to FIG. 5B. Operations 502, 504, and 506 may be performed before, after, or in parallel with operations 508 and 510.

The process 500 optionally includes operation 508 with accessing, e.g., using the control circuitry, a reference camera (e.g., camera array 538 described below in FIG. 5B), such as described below in relation to FIG. 5B. The process 500 optionally continues to operation 510 with capturing a training output image (e.g., training output image 545 in FIG. 5B) of a feature using the reference camera (e.g., camera array 538 described below in FIG. 5B), such as described below in relation to FIG. 5B. Operations 506 and 510 may be inputs into operation 512. Each of operations 506 and 510 may occur at different times and at different frequencies than another. Operations 504, 506, 508, and 510 are optional because the training input image and/or the training output image may exist, e.g., as part of an image library or a database, such as described below with respect to FIG. 5B.

The process 500 continues to operation 512 with comparing, e.g., using the control circuitry, an attempted reconstructed image (e.g., attempted reconstructed image 546 in FIG. 5B) to the training output image using a discriminator (e.g., discriminator 152 described below in FIG. 5B) and constructing a loss function, such as described below with respect to FIG. 5B. The loss function may calculate the differences between the attempted reconstructed image and the training output image.

The process 500 continues to operation 514 with a decision on whether the attempted reconstructed image is adequate. If the attempted reconstructed image is not adequate, the process continues to operation 516 with adjusting, e.g., using the control circuitry, the generator based on the loss function, e.g., through backpropagation, and thereafter returns to operation 506. Thus, the ML model may be trained using data defining the pattern of the mask. If the attempted reconstructed image is adequate, the process continues to operation 518 where the training is complete.

FIG. 5B shows an illustrative technique for training the ML model 144 for image reconstruction, in accordance with some embodiments of this disclosure. In the depicted embodiment, the ML model 144 is trained using a dataset generated by the display layer 102, mask 110, and image sensor 108, and a camera array 538. Light reflected off the feature 130 travels to a beam splitter 532, which splits the light into a first beam of light 534 and a second beam of light 536. The first beam of light 534 travels to the lensless camera 100. Only a portion of the first beam of light 534 travels through the display layer 102, through the mask 110, and to the image sensor 108, such as described in relation to FIG. 1. The image sensor 108 generates or captures the training input image 540 based on the portion of the first beam of light 534. Thus, the training input image 540 is specific to the pattern of the mask 110 (e.g., the opaque material 114 and portions 112 in FIG. 1). The image sensor 108 may use the mask 110 to capture light field information since the mask 110 directs light to the image sensor 108 from different viewpoints. For example, the mask 110 may be a phase mask that bends the portion of the first beam of light 534 to allow the image sensor 108 to capture the intensity and phase of the portion of the first beam of light 534. The captured phase may be used by the ML model 144 to generate a depth map of the feature 130 in the training input image 540 (or in the captured image 140 in FIG. 1).

The second beam of light travels to the camera array 538, which is shown as having three cameras. Each camera of the camera array 538 is used to capture perspective images 539, which are images that include the feature 130 taken from different angles. One of the three cameras may be positioned to have a substantially similar perspective as the lensless camera 100 and may capture an aligned image 541. The control circuitry 142 may generate a training depth map of the feature 130 based on the perspective images 539, e.g., by using stereo vision or stereo imaging techniques. The control circuitry 142 applies the training depth map to the aligned image 541 to generate the training output image 545. Thus, the training output image 545 includes a depth map (e.g., the training depth map). In some embodiments, the camera array 538 may have two cameras. In some embodiments, the camera array 538 may have four or more cameras.

In the depicted embodiments, the ML model 144 includes a deep learning neural network, such as a general adversarial network (GAN). The ML model 144 comprises a generator 150 and a discriminator 152. The ML model 144 is trained by accessing the training input image 540 and the training output image 545. The training input image 540 is inputted into the generator 150, which generates the attempted reconstructed image 546 and an attempted reconstructed depth map based on the training input image 540. The discriminator 152 compares the attempted reconstructed image 546 and the attempted reconstructed depth map with the training output image 545 and the training depth map to construct a loss function. The loss function may include any of a reconstruction loss, a perceptual loss, and an adversary loss. The ML model 144 is adjusted based on the comparison. The generator 150 uses the loss function as feedback to improve its own performance, such as by updating its own parameters, and regenerates the attempted reconstructed image 546. The discriminator 152 compares the regenerated attempted reconstructed image 546 to the training output image 545 and updates the loss function. This process is repeated until the attempted reconstructed image 546 adequately matches the training output image 545, which is when the ML model 144 may be considered a trained ML model 144.

In some embodiments, training may be complete when the performance of the generator 150 and the discriminator 152 has stabilized. In some embodiments, human evaluation, such as through visual inspection of the attempted reconstructed image 546 and the training output image 545, may be used to determine if training is complete. In some embodiments, a validation set of input and output images that differ from the training input image 540 and the training output image 545 (e.g., contain a different feature) may be used with the trained ML model 144 to verify training is complete. The resulting attempted reconstructed image may be evaluated using metrics such as the Fréchet Inception Distance or Inception Score, which provide a quantitative measure of the quality of the generated reconstructed image.

In some embodiments, the ML model 144 is a U-Net GAN. The U-Net GAN may use a segmentation network as the discriminator 152. In some embodiments, U-Net can be used as the generator 150.

In some embodiments, the ML model 144 trains to generate the attempted reconstructed image 546 and the attempted reconstructed depth map in separate processes. In some embodiments, the ML model 144 does not generate the attempted reconstructed depth map. In such embodiments, the mask 110 may not be a phase mask. In some embodiments, a single camera may be used instead of the camera array 538. The single camera may have a substantially similar perspective to the lensless camera 100 and may be used to capture a single training output image, which may be used as the training output image 545. During training of the ML model 144, the discriminator compares the attempted reconstructed image 546 with the single training output image to generate the loss function.

In some embodiments, the ML model 144 may use a training input image 540 and training output image 545 from a library of images or a database.

Figure 6:
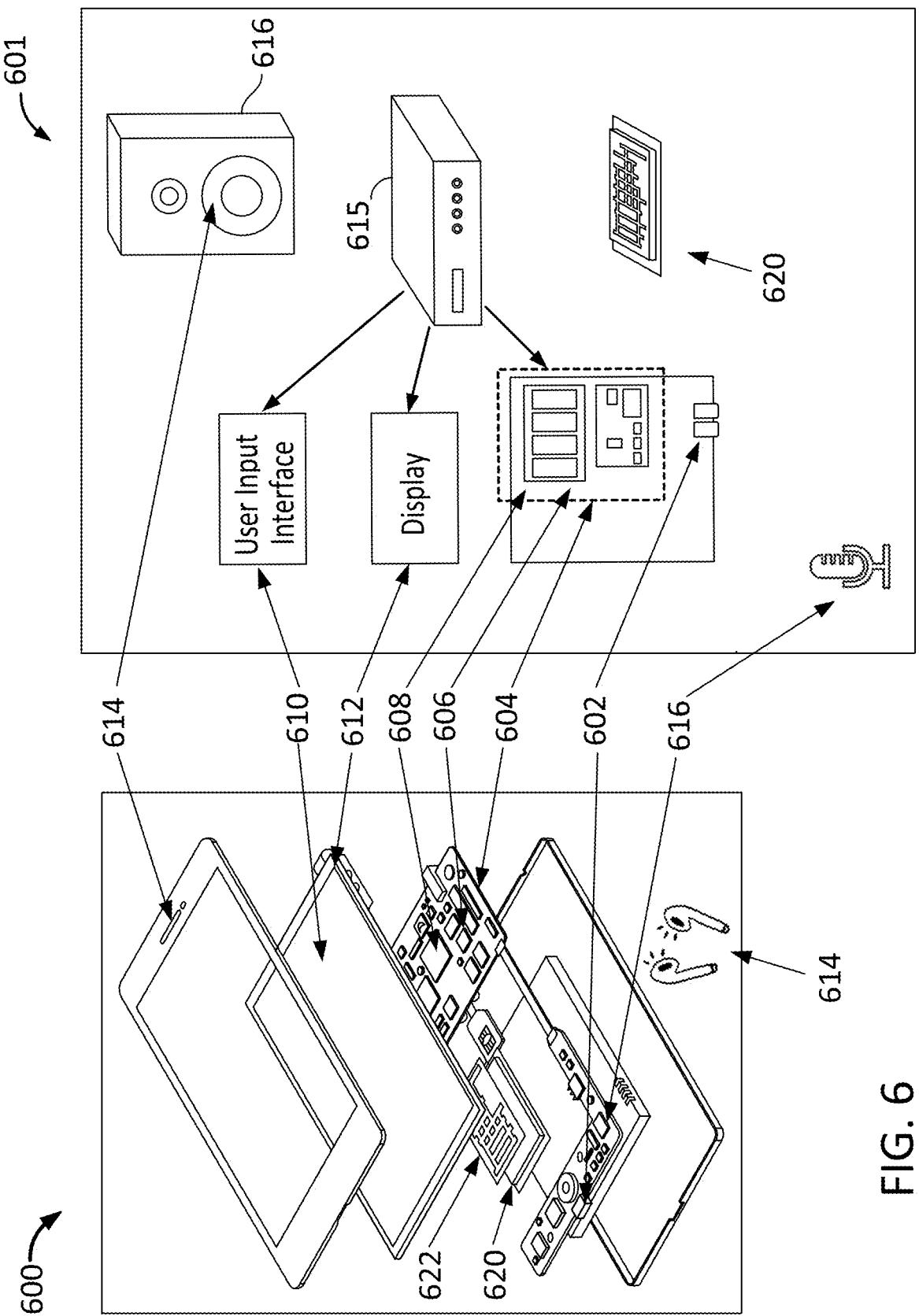
FIG. 6 shows an illustrative user equipment device, in accordance with some embodiments of this disclosure.
Figure 7:
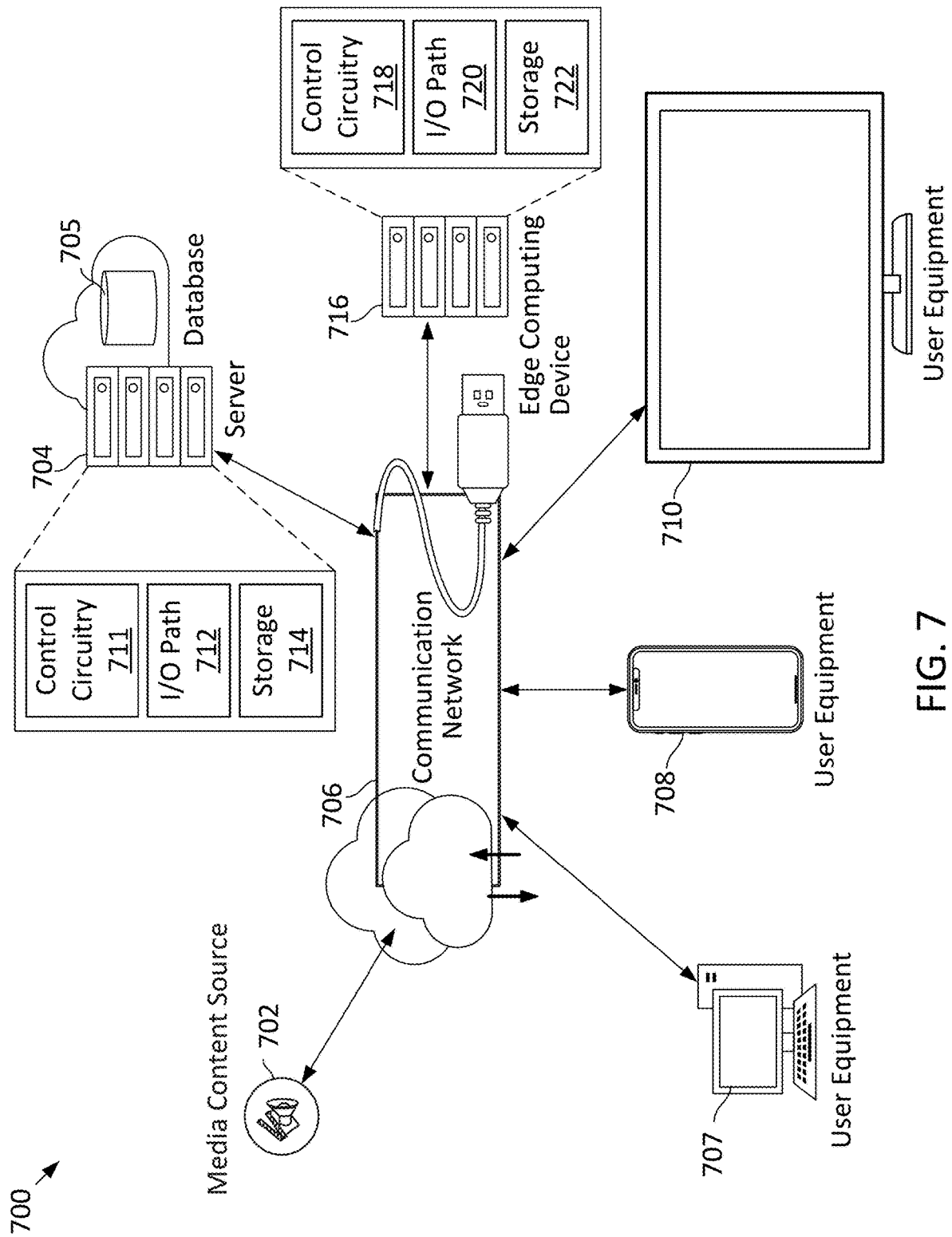
FIG. 7 shows an example system, in accordance with some embodiments of this disclosure.

FIGS. 6 and 7 depict illustrative devices, systems, servers, and related hardware for under-display image capture and image reconstruction. FIG. 6 shows generalized embodiments of illustrative user equipment devices 600 and 601, which may correspond to, e.g., control circuitry 142. For example, user equipment device 600 (referred to as device 600) may be a smartphone device, a tablet, a virtual reality or augmented reality device, or any other suitable device capable of processing image or video data. In another example, device 601 (referred to as device 601) may be a user television equipment system or device. Device 601, which may be a television, may include set-top box 615. Set-top box 615 may be communicatively connected to microphone 616, audio output equipment 614 (e.g., speaker or headphones), and display 612. In some embodiments, display 612 may be a television display or a computer display. In some embodiments, set-top box 615 may be communicatively connected to user input interface 610. In some embodiments, user input interface 610 may be a remote-control device. Set-top box 615 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path.

Each one of device 600 and device 601 may receive content and data via input/output (I/O) path 602. I/O path 602 may provide content (e.g., broadcast programming, on-demand programming, Internet content, content available over a local area network (LAN) or wide area network (WAN), and/or other content) and data (e.g., training input and output images, data defining a pattern of a mask, and data defining a layout of portions of a display layer that are at least partially transparent) to control circuitry 604, which may comprise processing circuitry 606 and storage 608. Control circuitry 604 may be used to send and receive commands, requests, and other suitable data using I/O path 602, which may comprise I/O circuitry. I/O path 602 may connect control circuitry 604 (and specifically processing circuitry 606) to one or more communications paths (described below). I/O functions may be provided by one or more of these communications paths, but are shown as a single path in FIG. 6 to avoid overcomplicating the drawing. While set-top box 615 is shown in FIG. 7 for illustration, any suitable computing device having processing circuitry, control circuitry, and storage may be used in accordance with the present disclosure. For example, set-top box 615 may be replaced by, or complemented by, a personal computer (e.g., a notebook, a laptop, a desktop), a smartphone (e.g., device 600), a tablet, a network-based server hosting a user-accessible client device, a non-user-owned device, any other suitable device, or any combination thereof.

Control circuitry 604 may be based on any suitable control circuitry such as processing circuitry 606. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 604 executes instructions for an image reconstruction application stored in memory (e.g., storage 608). Specifically, control circuitry 604 may be instructed by the image reconstruction application to perform the functions discussed above and below. In some implementations, processing or actions performed by control circuitry 604 may be based on instructions received from the image reconstruction application.

In client/server-based embodiments, control circuitry 604 may include communications circuitry suitable for communicating with a server or other networks or servers. The image reconstruction application may be a stand-alone application implemented on a device or a server. The image reconstruction application may be implemented as software or a set of executable instructions. The instructions for performing any of the embodiments discussed herein of the image reconstruction application may be encoded on non-transitory computer-readable media (e.g., a hard drive, random-access memory on a DRAM integrated circuit, read-only memory on a BLU-RAY disk, etc.). For example, in FIG. 6, the instructions may be stored in storage 608, and executed by control circuitry 604 of a device 600.

In some embodiments, the image reconstruction application may be a client/server application where only the client application resides on device 600 (e.g., device 101 in FIG. 1), and a server application resides on an external server (e.g., server 704 and/or server of an edge computing device 716 below in FIG. 7). For example, the image reconstruction application may be implemented partially as a client application on control circuitry 604 of device 600 and partially on server (e.g., server 704 below in FIG. 7) as a server application running on control circuitry (e.g., control circuitry 711 below in FIG. 7). Server 704 may be a part of a local area network with one or more of devices 600 or may be part of a cloud computing environment accessed via the internet. In a cloud computing environment, various types of computing services for performing searches on the internet or informational databases, providing image reconstruction capabilities, providing storage (e.g., for a database) or parsing data (e.g., using machine learning algorithms described above and below) are provided by a collection of network-accessible computing and storage resources (e.g., server 704 and/or edge computing device 716), referred to as "the cloud." Device 600 may be a cloud client that relies on the cloud computing capabilities from server 704 to determine whether processing (e.g., at least a portion of virtual background processing and/or at least a portion of other processing tasks) should be offloaded from the mobile device, and facilitate such offloading. When executed by control circuitry of server 704 or edge computing device 716, the image reconstruction application may instruct control circuitry (e.g., control circuitry 711 or 718 below in FIG. 7) to perform processing tasks for the client device and facilitate the image reconstruction.

Control circuitry 604 may include communications circuitry suitable for communicating with a server, edge computing systems and devices, a table or database server, or other networks or servers. The instructions for carrying out the above-mentioned functionality may be stored on a server (which is described in more detail below in connection with FIG. 7). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail below in connection with FIG. 7). In addition, communications circuitry may include circuitry that enables peer-to-peer communication of user equipment devices, or communication of user equipment devices in locations remote from each other (described in more detail below).

Memory may be an electronic storage device provided as storage 608 that is part of control circuitry 604. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 608 may be used to store various types of content described herein as well as image reconstruction application data described above. Nonvolatile memory may also be used (e.g., to launch a boot-up routine and other instructions). Cloud-based storage, described below in relation to FIG. 7, may be used to supplement storage 608 or instead of storage 608.

Control circuitry 604 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 604 may also include scaler circuitry for upconverting and downconverting content into the preferred output format of device 600. Control circuitry 604 may also include digital-to-analog converter circuitry and analog-to-digital converter circuitry for converting between digital and analog signals. The tuning and encoding circuitry may be used by device 600, 601 to receive and to display, to play, or to record content. The tuning and encoding circuitry may also be used to receive image or video image reconstruction data. The circuitry described herein, including for example, the tuning, image or video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 608 is provided as a separate device from device 600, the tuning and encoding circuitry (including multiple tuners) may be associated with storage 608.

Control circuitry 604 may receive instruction from a user by way of user input interface 610. User input interface 610 may be any suitable user interface, such as a remote control, mouse, trackball, keypad, keyboard, touch screen, touchpad, stylus input, joystick, voice recognition interface, or other user input interfaces. Display 612 may be provided as a stand-alone device or integrated with other elements of each one of device 600 and device 601. For example, display 612 may be a touchscreen or touch-sensitive display. In such circumstances, user input interface 610 may be integrated with or combined with display 612. In some embodiments, user input interface 610 includes a remote-control device having one or more microphones, buttons, keypads, any other components configured to receive user input or combinations thereof. For example, user input interface 610 may include a handheld remote-control device having an alphanumeric keypad and option buttons. In a further example, user input interface 610 may include a handheld remote-control device having a microphone and control circuitry configured to receive and identify voice commands and transmit information to set-top box 615.

Audio output equipment 614 may be integrated with or combined with display 612. Display 612 may be one or more of a monitor, a television, an LCD for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 612. Audio output equipment 614 may be provided as integrated with other elements of each one of device 600 and device 601 or may be stand-alone units. An audio component of videos and other content displayed on display 612 may be played through speakers (or headphones) of audio output equipment 614. In some embodiments, audio may be distributed to a receiver (not shown), which processes and outputs the audio via speakers of audio output equipment 614. In some embodiments, for example, control circuitry 604 is configured to provide audio cues to a user, or other audio feedback to a user, using speakers of audio output equipment 614. There may be a separate microphone 616 or audio output equipment 614 may include a microphone configured to receive audio input such as voice commands or speech. For example, a user may speak letters or words that are received by the microphone and converted to text by control circuitry 604. In a further example, a user may voice commands that are received by a microphone and recognized by control circuitry 604. Camera 620 may be any suitable image or video camera integrated with the equipment or externally connected. Camera 620 may be a digital camera comprising a CCD and/or a CMOS image sensor. In particular, camera 620 may include a lensless CMOS sensor masked with a mask (e.g., image sensor 108 and mask 110 in FIG. 1). Camera 620 may be an analog camera that converts to digital images via a video card.

The image reconstruction application may be implemented using any suitable architecture. For example, it may be a stand-alone application wholly-implemented on each one of device 600 and device 601. In such an approach, instructions of the application may be stored locally (e.g., in storage 608), and data for use by the application is downloaded on a periodic basis (e.g., from an out-of-band feed, from an Internet resource, or using another suitable approach). Control circuitry 604 may retrieve instructions of the application from storage 608 and process the instructions to provide image reconstruction functionality and preform any of the actions discussed herein. Based on the processed instructions, control circuitry 604 may determine what action to perform when input is received from user input interface 610. For example, movement of a cursor on a display up/down may be indicated by the processed instructions when user input interface 610 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

In some embodiments, the image reconstruction application is a client/server-based application. Data for use by a thick or thin client implemented on each one of device 600 and device 601 may be retrieved on-demand by issuing requests to a server remote to each one of device 600 and device 601. For example, the remote server may store the instructions for the application in a storage device. The remote server may process the stored instructions using circuitry (e.g., control circuitry 604) and generate the displays discussed above and below. The client device may receive the displays generated by the remote server and may display the content of the displays locally on device 600. This way, the processing of the instructions is performed remotely by the server while the resulting displays (e.g., that may include text, a keyboard, or other visuals) are provided locally on device 600. Device 600 may receive inputs from the user via input interface 610 and transmit those inputs to the remote server for processing and generating the corresponding displays. For example, device 600 may transmit a communication to the remote server indicating that an up/down button was selected via input interface 610. The remote server may process instructions in accordance with that input and generate a display of the application corresponding to the input (e.g., a display that moves a cursor up/down). The generated display is then transmitted to device 600 for presentation to the user.

In some embodiments, the image reconstruction application may be downloaded and interpreted or otherwise run by an interpreter or virtual machine (run by control circuitry 604). In some embodiments, the image reconstruction application may be encoded in the ETV Binary Interchange Format (EBIF), received by control circuitry 604 as part of a suitable feed, and interpreted by a user agent running on control circuitry 604. For example, the image reconstruction application may be an EBIF application. In some embodiments, the image reconstruction application may be defined by a series of JAVA-based files that are received and run by a local virtual machine or other suitable middleware executed by control circuitry 604. In some of such embodiments (e.g., those employing MPEG-2 or other digital media encoding schemes), image reconstruction application may be, for example, encoded and transmitted in an MPEG-2 object carousel with the MPEG audio and video packets of a program.

FIG. 7 is a diagram of an illustrative system 700 for under-display image capture and image reconstruction, in accordance with some embodiments of this disclosure. User equipment devices 707, 708, 710 (e.g., which may correspond to one or more of device 101 may be coupled to communication network 706). Communication network 706 may be one or more networks including the Internet, a mobile phone network, mobile voice or data network (e.g., a 5G, 4G, or LTE network), cable network, public switched telephone network, or other types of communication network or combinations of communication networks. Paths (e.g., depicted as arrows connecting the respective devices to the communication network 706) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 7 to avoid overcomplicating the drawing.

Although communications paths are not drawn between user equipment devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment devices may also communicate with each other directly through an indirect path via communication network 706.

System 700 may comprise media content source 702, one or more servers 704, and one or more edge computing devices 716 (e.g., included as part of an edge computing system, such as, for example, managed by mobile operator). In some embodiments, the image reconstruction application may be executed at one or more of control circuitry 711 of server 704 (and/or control circuitry of user equipment devices 707, 708, 710 and/or control circuitry 718 of edge computing device 716). In some embodiments, a data structure containing the training input and output images, may be stored at database 705 maintained at or otherwise associated with server 704, and/or at storage 722 and/or at storage of one or more of user equipment devices 707, 708, 710.

In some embodiments, server 704 may include control circuitry 711 and storage 714 (e.g., RAM, ROM, Hard Disk, Removable Disk, etc.). Storage 714 may store one or more databases. Server 704 may also include an input/output path 712. I/O path 712 may provide image reconstruction data, device information, or other data, over a local area network (LAN) or wide area network (WAN), and/or other content and data to control circuitry 711, which may include processing circuitry, and storage 714. Control circuitry 711 may be used to send and receive commands, requests, and other suitable data using I/O path 712, which may comprise I/O circuitry. I/O path 712 may connect control circuitry 711 (and specifically control circuitry) to one or more communications paths.

Control circuitry 711 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 711 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 711 executes instructions for an emulation system application stored in memory (e.g., the storage 714). Memory may be an electronic storage device provided as storage 714 that is part of control circuitry 711.

Edge computing device 716 may comprise control circuitry 718, I/O path 720 and storage 722, which may be implemented in a similar manner as control circuitry 711, I/O path 712 and storage 722, respectively of server 704. Edge computing device 716 may be configured to be in communication with one or more of user equipment devices 707, 708, 710 and server 704, which may be a video server, over communication network 706, and may be configured to perform processing tasks (e.g., image reconstruction) in connection with ongoing processing of image or video data. In some embodiments, a plurality of edge computing devices 716 may be strategically located at various geographic locations, and may be mobile edge computing devices configured to provide processing support for mobile devices at various geographical regions.

Figure 8B:
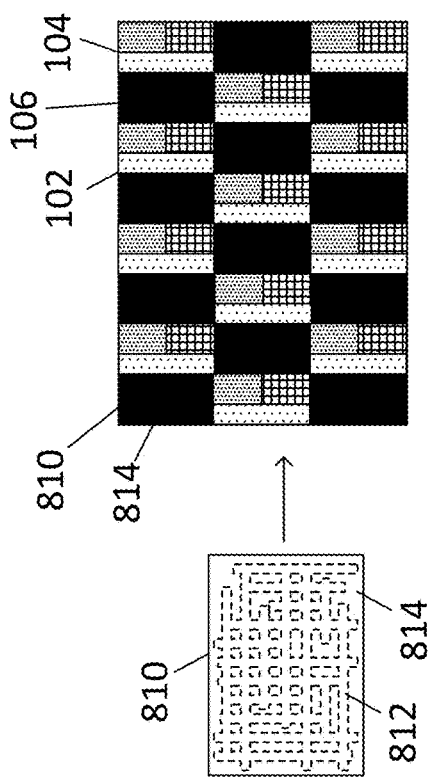
FIGS. 8A-8C show illustrative diagrams of adjusting a pattern of a mask, in accordance with some embodiments of this disclosure.
Figure 8A:
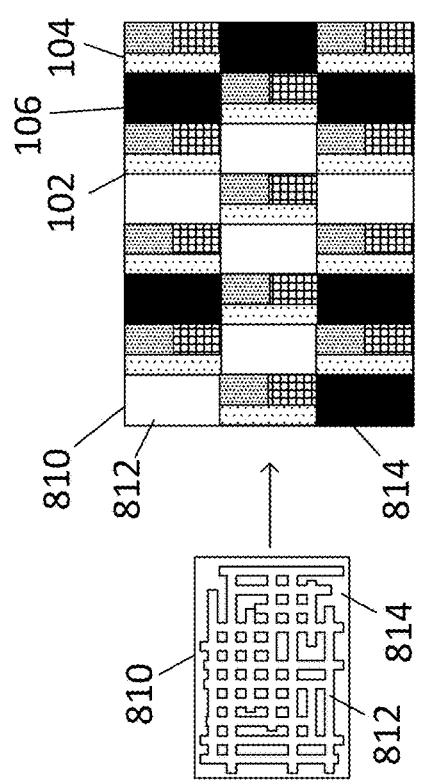
Figure 8C:
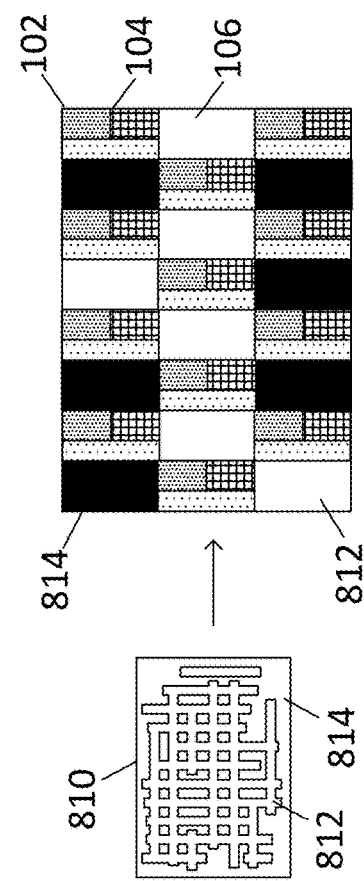

FIGS. 8A-8C show illustrative diagrams of adjusting a pattern of a mask 810, in accordance with some embodiments of this disclosure. In particular, each of FIGS. 8A-8C show the mask 110 on the left side and an overhead view of a portion of the display layer 102 positioned over the mask 810 on the right side. The mask 810 includes portions 812 that are at least partially transparent and opaque material 814. In the depicted embodiments, the mask 810 includes a transparent substrate and the portions 812 are formed by transparent portions of the mask 810 substrate. The transparency of the mask 810 may be turned on and off, e.g., by control circuitry (e.g., control circuitry in FIG. 1), to adjust a pattern of the mask 810 for allowing light that is directed through the portions 106 of the display layer 102 to be directed to an underlying image sensor (e.g., image sensor 108 in FIG. 1). The transparency may be turned on and off by reconfiguring the opaque material 814, which in turn reconfigures the portions 812. In some embodiments, the opaque material 814 of the mask 810 may be turned on and off or reconfigured. In some embodiments, the mask 810 includes an electronic ink layer, which may include the opaque material 814. In some embodiments, the opaque material 814 includes liquid crystals. The liquid crystals may be configured in different segments that may turn opaque when an electric charge is applied (e.g., the liquid crystals are turned on) and transparent when there is no electric charge (e.g., the liquid crystals are turned off), such as in a segmented LCD.

Collectively, FIGS. 8A-8C illustrate different patterns of the mask 810 resulting from turning on and off the transparency of the mask 810. FIG. 8A shows a first pattern of the mask 810 where a first subset of the portions 106 of the display layer 102 align with the portions 812 of the mask 810. FIG. 8B shows a second pattern of the mask 810 where the mask 810 is opaque. For example, the opaque material 814 of the mask 810 is arranged to block the light directed through the portions 106 of the display layer 102. FIG. 8C shows a third pattern of the mask 810 where a second subset of the portions 106 of the display layer 102 align with the portions 812 of the mask 810. The second subset is different than the first subset in FIG. 8A. The first and second subsets may include some of the same portions 812.

Figure 9B:
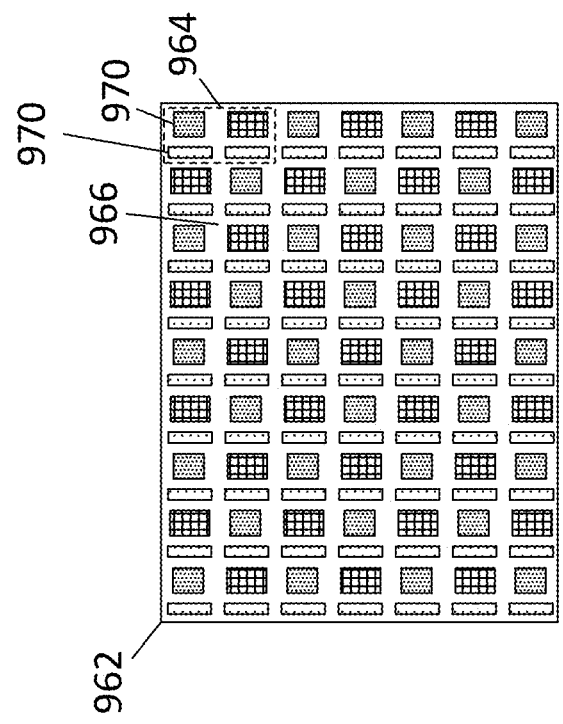
FIGS. 9A and 9B show illustrative diagrams of arrays of pixel elements, in accordance with some embodiments of this disclosure.
Figure 9A:
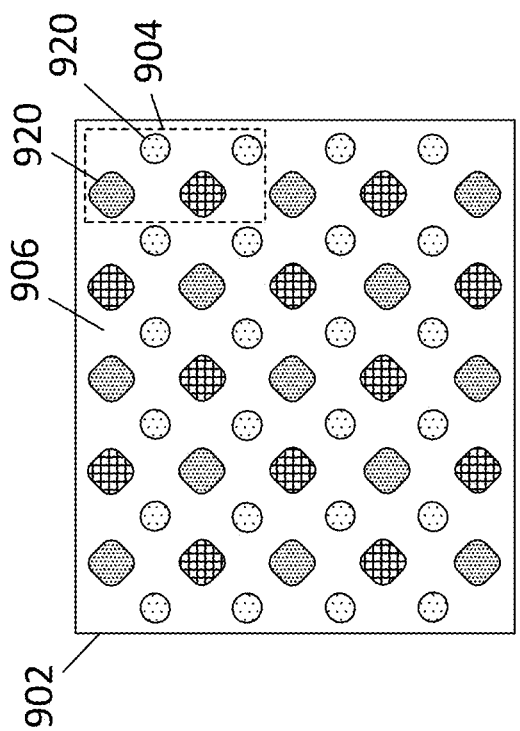

FIGS. 9A and 9B show illustrative diagrams of arrays of pixel elements (e.g., pixel elements 904 and 964), in accordance with some embodiments of this disclosure.

FIG. 9A shows a display layer 902, which includes the pixel elements 904 and portions 906 that are at least partially transparent. Each pixel element 904 includes subpixels 920.

In the depicted embodiment, the subpixels 920 are shaped as rounded rectangles (e.g., squircles) and ovals, which are smaller than the rounded rectangles. Each pixel element 904 includes two rounded rectangle subpixels 920 (e.g., each one emitting a different color) and two oval subpixels 920 (e.g., emitting the same color, but different than the colors of the rounded rectangles). The rounded rectangle subpixels 920 are arranged in a checkerboard pattern and the oval subpixels are positioned at intersections of the checkerboard pattern. The portions 906 are formed between the subpixels 920 such that they surround the subpixels 920 when viewed from above.

FIG. 9B shows a display layer 962, which includes the pixel elements 964 and portions 966 that are at least partially transparent. In the depicted embodiment, each pixel element 964 includes four rectangular-shaped subpixels 970. Two of the subpixels 970 (e.g., thin subpixels) emit the same color and have a length that is at least twice the width. The remaining two subpixels 970 (e.g., full subpixels) emit colors different from one another and different from the thin subpixels and have a length than is less than twice the width. The subpixels 970 are arranged in alternating columns, where one column contains the skinny subpixels and the other column contains the full subpixels alternating between the emitted color. The subpixels 970 do not touch another and the portions 966 are formed therebetween.

Although FIGS. 9A and 9B show two pixel element configurations, other configurations may be used with the concepts disclosed herein.

The embodiments discussed above are intended to be illustrative and not limiting. One skilled in the art would appreciate that individual aspects of the apparatus and methods discussed herein may be omitted, modified, combined, and/or rearranged without departing from the scope of the disclosure. Only the claims that follow are meant to set bounds as to what the present disclosure includes.

What is claimed is:

1. A system comprising:
   a display layer comprising:
      a plurality of pixel elements; and
      portions between the pixel elements that are at least partially transparent;
   an image sensor positioned under the display layer;
   a mask disposed between the image sensor and the display layer, wherein the mask comprises a configurable pattern for allowing light that is directed through a subset of the portions between the pixel elements to be directed to the image sensor; and
   control circuitry configured to change the pattern of the mask for allowing light by selectively turning on and off transparency of the mask.

2. The system of claim 1, wherein the portions between the pixel elements that are at least partially transparent comprise holes.

3. The system of claim 1, wherein the portions between the pixel elements that are at least partially transparent comprise a transparent material.

4. The system of claim 1, further comprising a lensless camera, wherein the lensless camera comprises the image sensor, the mask, and a portion of the display layer disposed above the mask.

5. The system of claim 1, wherein the control circuitry is configured to:
   set the mask to be opaque when a subset of the plurality of pixel elements emit light and the image sensor is not active, the subset of the plurality of pixel elements disposed above the mask; and
   set at least a portion of the mask to be transparent when the subset of the plurality of pixel elements do not emit light and the image sensor is active.

6. The system of claim 1, wherein:
   the mask comprises an electronic ink layer; and
   the control circuitry is configured to turn on and off the transparency of the mask by reconfiguring the electronic ink layer.

7. The system of claim 1, wherein the image sensor is configured to generate a captured image based on the light that is directed through the subset of the portions between the pixel elements and through the pattern of the mask.

8. The system of claim 7, further comprising control circuitry configured to generate a reconstructed image based on the captured image and data defining the pattern of the mask.

9. The system of claim 8, wherein the control circuitry is configured to generate the reconstructed image by inputting the captured image into a trained machine learning model, wherein the machine learning model was trained by:
   accessing a training input image and a corresponding training output image, wherein the training input image is specific to the pattern of the mask;
   inputting the training input image into the machine learning model to generate an attempted reconstructed image; and
   adjusting the machine learning model based on comparing the attempted reconstructed image with the training output image.

10. The system of claim 1, wherein pixel elements of the plurality of pixel elements comprise a casing to block light emitted by the pixel elements from the image sensor.

11. The system of claim 1, further comprising a plurality of microlenses, wherein:
   the pattern of the mask allows light that is directed through a subset of the plurality of microlenses to be directed to the image sensor.

12. The system of claim 1, wherein the control circuitry is configured to set the mask to be opaque when the image sensor is not active.

13. The system of claim 1, wherein the control circuitry is configured to change the pattern of the mask from a first pattern to a second pattern based at least in part on a received command to modify privacy.

14. A method comprising:
   generating a reconstructed image based on a captured image and data defining a pattern of a mask, wherein:
      the captured image is based on a light that was directed through the pattern of the mask and through a display layer, the display layer comprising:
         a plurality of pixel elements; and
         portions between the pixel elements that are at least partially transparent; and
      the pattern of the mask is configurable and allows at least a portion of light that is directed through a subset of the portions between the pixel elements to be directed through the pattern of the mask; and
   storing the reconstructed image in memory; and
   changing the pattern of the mask by selectively turning on and off transparency of the mask.

15. The method of claim 14, wherein the portions between the pixel elements that are at least partially transparent comprise holes.

16. The method of claim 14, wherein the portions between the pixel elements that are at least partially transparent comprise a transparent material.

17. The method of claim 14, wherein:
the captured image is captured using a lensless camera;
the lensless camera comprises an image sensor, the mask, and the subset of the portions between the pixel elements; and
the light that is directed through the pattern of the mask is directed to the image sensor.

18. The method of claim 14, further comprising:
setting the mask to be opaque when a subset of the plurality of pixel elements emit light, the subset of the plurality of pixel elements disposed above the mask; and
setting at least a portion of the mask to be transparent when the subset of the plurality of pixel elements do not emit light.

19. The method of claim 14, further comprising inputting the captured image into a trained machine learning model, wherein the machine learning model was trained by:
accessing a training input image and a corresponding training output image, wherein the training input image is specific to the pattern of the mask;
inputting the training input image into the machine learning model to generate an attempted reconstructed image; and
adjusting the machine learning model based on comparing the attempted reconstructed image with the training output image.

20. The method of claim 14, further comprising displaying an image on the display layer, when capturing the captured image, that is different than the captured image and the reconstructed image.

\* \* \* \* \*